(12) United States Patent
Shin

(10) Patent No.: US 6,834,352 B2
(45) Date of Patent: Dec. 21, 2004

(54) METHOD AND APPARATUS FOR MAXIMIZING AN ADVERTISING EFFECT USING A CONTROL UNIT TO DETECT IF ADVERTISEMENT IS BEING DISPLAYED AND SUSPENDING A FUNCTION IF ADVERTISEMENT IS NOT DISPLAYED

(75) Inventor: Kum-Ho Shin, Kwacheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 09/735,505

(22) Filed: Dec. 14, 2000

(65) Prior Publication Data
US 2002/0019901 A1 Feb. 14, 2002

(30) Foreign Application Priority Data
Aug. 4, 2000 (KR) .................................... 2000-45283

(51) Int. Cl.[7] ............................ G06F 1/26; G06F 15/16; G06F 17/60; G06F 13/24
(52) U.S. Cl. ........................ 713/300; 713/323; 713/324; 709/218; 709/223; 709/227; 705/1; 705/14; 710/260
(58) Field of Search ............................... 713/300, 323, 713/324; 709/218, 223, 227; 705/1, 14; 370/260, 352; 710/260

(56) References Cited

U.S. PATENT DOCUMENTS

| | | | |
|---|---|---|---|
| 5,809,242 A | | 9/1998 | Shaw et al. |
| 5,838,790 A | | 11/1998 | McAuliffe et al. |
| 6,014,502 A | | 1/2000 | Moraes |
| 6,148,332 A | * | 11/2000 | Brewer et al. ............... 709/218 |
| 6,266,328 B1 | * | 7/2001 | Johnson et al. ............. 370/260 |
| 6,298,056 B1 | * | 10/2001 | Pendse ........................ 370/352 |
| 6,442,529 B1 | * | 8/2002 | Krishan et al. ............... 705/14 |

OTHER PUBLICATIONS

Katie (kamblue78@hotmail.compress), Newsgroups: <alt.online-service.prodigy>, Date: Aug. 6, 1999, "Re: Online services". Online Posting. Internet Search.*

J C (jcostanz@gte.net), Newsgroups: <alt.music.prince>, Date: Feb. 16, 1999, "Re: Free Internet Access (unrelated)", Online Posting, Internet Search.* ptrptr (ptrptr@online.no), Newsgroups: <comp.os.ms-windows.misc>, date May 7, 2000, "Re:Connecting automatically when windows starts", online posting, Internet search.*

Aleksandr Konosevich (Aleksandr.Konosevice@f9.n5005.z2.fidonet.org), Newsgroups: <fido7.ru.hacker.dummy>, Date Apr. 4, 1998, online posting, Internet search.*

* cited by examiner

Primary Examiner—Thomas Lee
Assistant Examiner—James Trujillo
(74) Attorney, Agent, or Firm—Robert E. Bushnell, Esq.

(57) ABSTRACT

A computer includes a central processing unit (CPU), a memory, an input unit, a monitor, an advertisement presenting program for presenting an advertisement on the monitor, and a controlling unit for detecting whether the advertisement presenting program is in operation. The controlling unit suspends at least one function of the central processing unit when the advertisement present program is not in operation. With this configuration, an advertising effect can be maximized because advertisements can be presented while computers are used off-line.

17 Claims, 3 Drawing Sheets

METHOD AND APPARATUS FOR MAXIMIZING AN ADVERTISING EFFECT USING A CONTROL UNIT TO DETECT IF ADVERTISEMENT IS BEING DISPLAYED AND SUSPENDING A FUNCTION IF ADVERTISEMENT IS NOT DISPLAYED

CLAIM OF PRIORITY

This application makes reference to, incorporates the same herein, and claims all benefits accruing under 35 U.S.C. §119 from my application COMPUTER AND METHOD FOR CONTROLLING THE SAME filed with the Korean Industrial Property Office on Aug. 4, 2000 and there duly assigned Ser. No. 45283/2000.

BACKGROUND OF THE INVENTION

1. Technical Field

The present invention relates in general to computers and methods for controlling the same, and more particularly, to a computer and a method for controlling the same which can maximize an advertising effect.

2. Related Art

These days computers are extensively used in our daily life. Along with this, there has been a sharp increase in the number of users who work with the computers for a considerable period of time, almost all day long. Thus, a good number of computer-based advertisements have been developed, but most of them have been presented on an on-line basis via network such as Internet and the like.

However, most of time the users are working with computers off-line, being disconnected from the network. In consideration of this, if an advertisement can be presented to the users off-line and on-line, the advertising effect will increase. In addition, if a compensation is awarded to the users who view the advertisement, they may reduce the cost of purchasing computers making use of the compensation.

I have found that online advertising effect is not complete enough. Efforts have been made to enhance advertising.

Exemplars of recent efforts in the art include U.S. Pat. No. 5,809,242 to Shaw et al., entitled ELECTRONIC MAIL SYSTEM FOR DISPLAYING ADVERTISEMENT AT LOCAL COMPUTER RECEIVED FROM REMOTE SYSTEM WHILE THE LOCAL COMPUTER IS OFF-LINE THE REMOTE SYSTEM, issued on Sep. 15, 1998, U.S. Pat. No. 6,014,502 to Moraes, entitled ELECTRONIC MAIL SYSTEM WITH ADVERTISING, issued on Jan. 11, 2000, and U.S. Pat. No. 5,838,790 to McAuliffe et al., entitled ADVERTISEMENT AUTHENTICATION SYSTEM IN WHICH ADVERTISEMENTS ARE DOWNLOADED FOR OFF-LINE DISPLAY, issued on Nov. 17, 1998.

While these recent efforts provide advantages, I note that they fail to adequately provide an efficient and convenient computer and method for maximizing an advertising effect, including compensation aspects.

SUMMARY OF THE INVENTION

The present invention has been made keeping in mind the above-described need, and an object of the present invention is to provide a computer and a method for controlling the same, capable of presenting an advertisement to a user while he or she is using a computer off-line.

This and other objects of the present invention may be achieved by providing a computer comprising a central processing unit (CPU), a memory, an input unit and a monitor, the computer further comprising an advertisement presenting program for presenting an advertisement on the monitor, and a controlling unit for detecting whether the advertisement presenting program is in operation, wherein the controlling unit suspends at least one function of the CPU when the advertisement present program is not in operation.

It is effective that a computer further comprises a system management interrupt (SMW) generator for periodically generating interrupt signals during operation of the CPU, and a system management mode (SMM) program stored in the memory, for checking whether the advertisement presenting program is operated according to the interrupt signals from the SMI generator, to prevent a user from deleting the advertisement presenting program.

It is also effective that the advertisement presenting program writes a data value to indicate that the advertisement presenting program is in operation when the interrupt signals from the SMI generator are generated, into an interface in the memory, and the SMM program periodically ascertains the data value when the interrupt signals from the SMI generator are generated and clears it, in order to ascertain whether the advertisement presenting program is in operation.

Effectively, the memory has a read only memory basic input output system (ROM BIOS) and a complementary metal oxide semiconductor (CMOS), and the interface is provided in either of the ROM BIOS or the CMOS, in terms of processing speed of the computer system. Preferably, the memory has further a ROM BIOS, and the SMM program is stored in said ROM BIOS, thereby preventing a user from deleting the SMM program arbitrarily.

Effectively, the controlling unit has a function of cutting off power supply to the CPU, to stop operation of the CPU, and a function of disabling an input port of the CPU to which the input unit is connected, to stop operation of the CPU, thereby preventing a user from stopping the advertisement presenting program arbitrarily. Preferably, the computer further comprises an auxiliary storage for storing the advertisement presenting program and an application program.

According to another aspect of the present invention, this and other objects may be achieved by providing a method for controlling a computer comprising a CPU, a memory, an input unit and a monitor, the method comprising the steps of presenting an advertisement to the monitor when the CPU is activated, checking periodically to detect whether the advertisement is presented to the monitor while the CPU is in operation, and stopping at least one function of the CPU where it is detected that the advertisement is not presented to the monitor as a result of checking.

The step of checking presentation of the advertisement is comprised of the substeps of generating periodically SMI interrupt signals, writing a data value to indicate that the advertisement is presented whenever the SMI interrupt signals are generated, in an interface of the memory, and ascertaining periodically the data value according to the SMI interrupt signals and clear it.

It is effective that the step of stopping the function of the CPU includes the step of cutting off the power supply to said CPU, and disabling an input port of the CPU.

To achieve these and other objects in accordance with the principles of the present invention, as embodied and broadly described, the present invention provides a computer apparatus, comprising: a central processing unit said central processing unit performing functions including receiving data, processing data, and outputting data; a memory storing information of said computer; a display unit displaying varying visual images to a user, said display unit being coupled to said computer; said memory storing an advertisement presenting program for presenting an advertisement on said display unit, said advertisement presenting program automatically commencing operation after said computer is booted up and suspending operation in response to an action by the user; and a control unit detecting when said advertisement presenting program is operating, said control unit suspending at least one of said functions of said central processing unit when operation of said advertisement present program is suspended.

To achieve these and other objects in accordance with the principles of the present invention, as embodied and broadly described, the present invention provides an apparatus, comprising: a first control unit having an input port, said first control unit performing functions including receiving data and outputting data; an input unit inputting information to said input port of said first control unit; a memory storing an advertisement presenting program; a display unit displaying at least one advertisement to a user in accordance with said advertisement presenting program, said advertisement presenting program automatically commencing operation after said apparatus is turned on and suspending operation in response to an action by the user; and a second control unit detecting when said advertisement presenting program is operating, said second control unit suspending at least one of said functions of said first control unit when operation of said advertisement present program is suspended.

To achieve these and other objects in accordance with the principles of the present invention, as embodied and broadly described, the present invention provides a method, comprising: automatically displaying at least one advertisement on a display monitor when a first control unit is activated and not displaying said at least one advertisement in response to an action by the user, said first control unit performing functions including receiving data and outputting data; checking periodically to detect if said at least one advertisement is being displayed on said monitor when said first control unit is operating; and stopping at least one of said functions of said first control unit when said at least one advertisement is not being displayed on said monitor.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
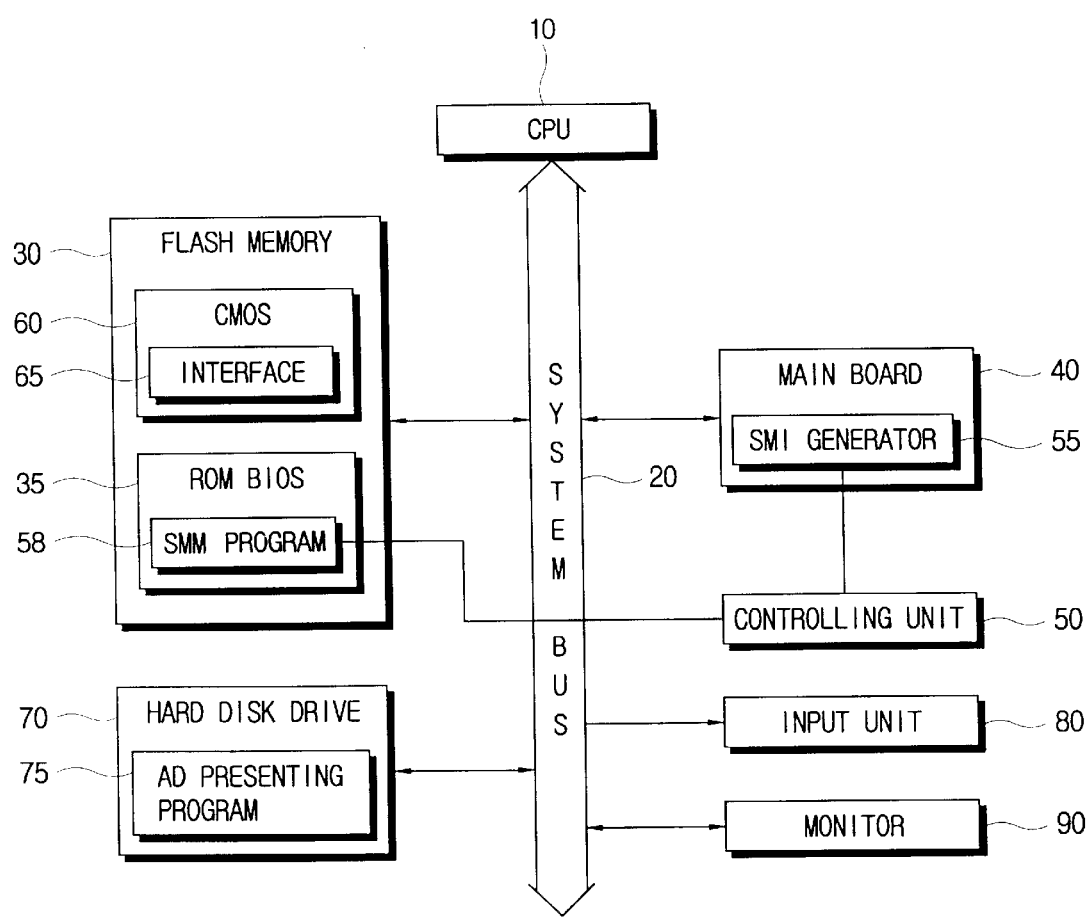
FIG. 1 is a block diagram of a computer, in accordance with the principles of the present invention.

Referring to FIG. 1 which is a block diagram of a computer according to the present invention, a computer comprises a flash memory 30 which is a nonvolatile memory for storing basic input and output system (BIOS) data involved in basic operations of the computer system, and a central processing unit (CPU) 10 for reading the BIOS data from the flash memory 30, booting up the computer system and executing an application program. The computer further comprises a main board 40 in which the flash memory 30 and the CPU 10 are installed, a hard disk drive 70 which is an auxiliary storage device for storing the application program, an input unit 80 and a monitor 90.

The computer further includes a controlling unit 50 controlling a system management interrupt (SMI) generator 55 provided in the main board 40 for generating interrupt signals periodically according to operation of the CPU 10 so as to run the application program in the CPU, and a system management mode (SMM) program 58 stored in the flash memory 30 being driven according to the interrupt signals from the SMI generator 55.

The flash memory 30 has both functions of read only memory (ROM) preserving the stored information during cut-off of the power supply and a random-access memory (RAM) having non-restricted reading and writing functions. In the flash memory 30 is provided a complementary metal-oxide-semiconductor (CMOS) 60 having a ROM BIOS 35 and an interface 65 which is a temporary data storage. The ROM BIOS 35 serves to execute a power-on-self test (POST) routine for checking hardware of the computer as it is booted up. When the system is run, the POST routine of the ROM BIOS 35 automatically and internally checks respective components of the system to check the peripheral hardware.

The CPU 10 boots up the computer system based on the BIOS data read out from the ROM BIOS 35 in the flash memory 30. That is, if the ROM BIOS 35 in the flash memory 30 runs the POST routine and reads out boot records of the hard disk drive 80, the controlling unit 50 transmits the read out boot records to the CPU 10 through a system bus 20. Subsequently, the CPU 10 boots up the computer system according to the present booting orders and executes the application program.

As one of application programs, an advertisement presenting program 75 for reading i out advertisement data and presenting an advertisement based on the read out ad data is stored in the hard disk drive 70. The advertisement presenting program 75 is comprised of an advertisement data (not shown) and an advertisement driving program (not shown) for driving the advertisement data. The advertisement driving program 75 drives the advertisement data while the operating system is being driven, and presents an advertisement 100 to a user. The advertisement presenting program 75 detects itself whether it is in operation according to generation of the interrupt signals from the SMI generator 55 written in the interface 65. Thus, the controlling unit 50 checks the interface 65 to detect whether the advertisement presenting program 75 is being driven.

The SMI generator 55 is a chipset provided in the main board 40 for generating the interrupt signals. The SMI generator 55 sends predetermined interrupt signals to the CPU 10 so that the CPU 10 stops a current job and performs other jobs as requested. The SMI chipsets over the i8xx series of Intel™ which are currently available in the market generate the interrupt signals periodically while the CPU 10 is in operation.

If the SMI interrupt signals are periodically generated from the SMI generator 55, the SMM program 58 stored in the ROM BIOS 35 in the flash memory 30 is opened up. The SMM program 58 of the controlling unit 50 is a program activated according to the periodic generation of the interrupt signals from the SMI generator 55 so that the CPU 10 can perform other commands. The controlling unit 50 stores a current job being conducted by the CPU 10 in a temporary memory (not shown) when the interrupt signals are generated from the SMI generator 55 while the operating system is in operation, and executes the SMM program 58 based on the program code internally established by the SMM program 58.

The program code internally established by the SMM program 58 is a program code for detecting whether the advertisement presenting program 75 is activated while the CPU 10 is in operation, and further detecting the interface 65 in which a data value indicating the operation of the advertisement presenting program 75 is stored. Where it is detected that the advertisement presenting program 75 is operated, the SMM program 58 suspends the program code and reactivates the operating system based on the job stored in the temporary memory. Where it is detected that the advertisement presenting program 75 is not operated, the SMM program 58 performs a program code preset to stop the system. The system stoppage code has a method of disabling an input port of the CPU 10 to which the input device is connected, making it impossible to enter into the computer, or a method of cutting off the power supply to the CPU 10. The system stoppage code may further include a method of forcibly stopping the operating system.

Figure 2:
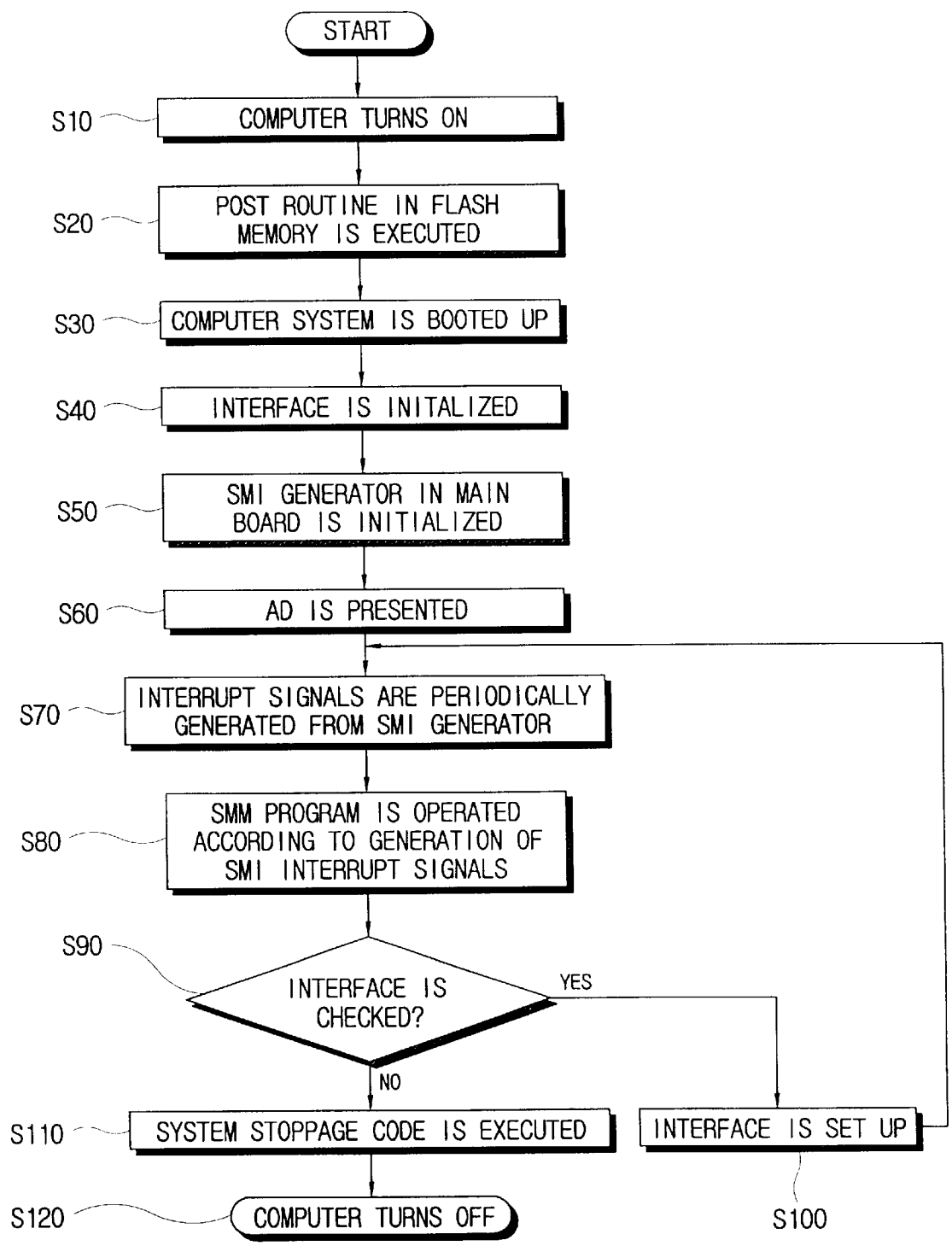
FIG. 2 is a flow chart of an advertising program for a computer, in accordance with the principles of the present invention.

Referring to FIG. 2, a process of driving the advertisement presenting program of the computer according to the present invention will be described. When power is applied to the computer system (S10), the controlling unit 50 activates the ROM BIOS 35 within a flash memory 30 to execute the POST routine so as to check hardware units of the computer (S20). After the POST routine is executed, the controlling unit 50 boots up the computer system (S30) and initializes an interface 65 and an SMI generator 55 in the main board (S40 & S50). After the interface 65 is initialized, the advertisement 100 is presented to a user through the monitor 90 (S60). After the advertisement 10 is presented, the SMI generator 55 periodically generates SMI interrupt signals (S70). The SMM program 58 is periodically operated according to periodic generation of the interrupt signals S80 and checks the interface 65 to detect whether the advertisement presenting program 75 is currently in operation (S90). The advertisement presenting program 75 is activated and periodically writes the numeral 0 onto the interface 65 whenever the SMI interrupt signals are generated. When the SMI interrupt signals are generated, the SMM program (58) checks the interface 65 to detect whether the numeral written onto the interface 65 is 0 or 1. If it is detected that the numeral written onto the interface 65 is 0, the SMM program 58 of the controlling unit 50 determines that the advertisement presenting program 75 is regularly operated. The controlling unit 50 converts the numeral written onto the interface 65 into 1 to then stop operation of the SMM program 58. If the interrupt signals are generated again from the SMI generator 55, the controlling unit 50 drives the SMM program 58 to set up the interface 65 (S100), as described in the above. Whereas, in the checking step (S90) of the interface while the SMM program 58 is in operation, if the numeral written onto the interface 65 is 1, it is detected that the advertisement presenting program 75 is not regularly operated. Accordingly, the SMM program 58 executes the program code for stopping the computer system (S110) and turns off the power supply to the computer (S120).

In the above-described preferred embodiment of the present invention, the SMM program 58 is stored in the ROM BIOS 35 within the flash memory 30. However, a separate memory may be provided for storing the SMM program 58.

In the above-described preferred embodiment of the present invention, the interface is provided in the CMOS. However, the interface may be provided in the ROM BIOS or in other additional memories.

In the above-described preferred embodiment of the present invention, the advertisement presenting program 75 is stored in the hard disk drive 70 which is an auxiliary storage. However, it can be stored in the CMOS 60 or the memory as well.

In the above-described preferred embodiment of the present invention, the interface 65 stored in the CMOS 60 or the memory is checked according to the interrupt signals periodically generated from the SMI generator 55, in order to detect in the SMM program 58 whether the advertisement presenting program 75 is being driven. However, this is only for the way of example. Whether the advertisement presenting program 75 is being driven may be detected through a variety of manners using software.

Figure 3:
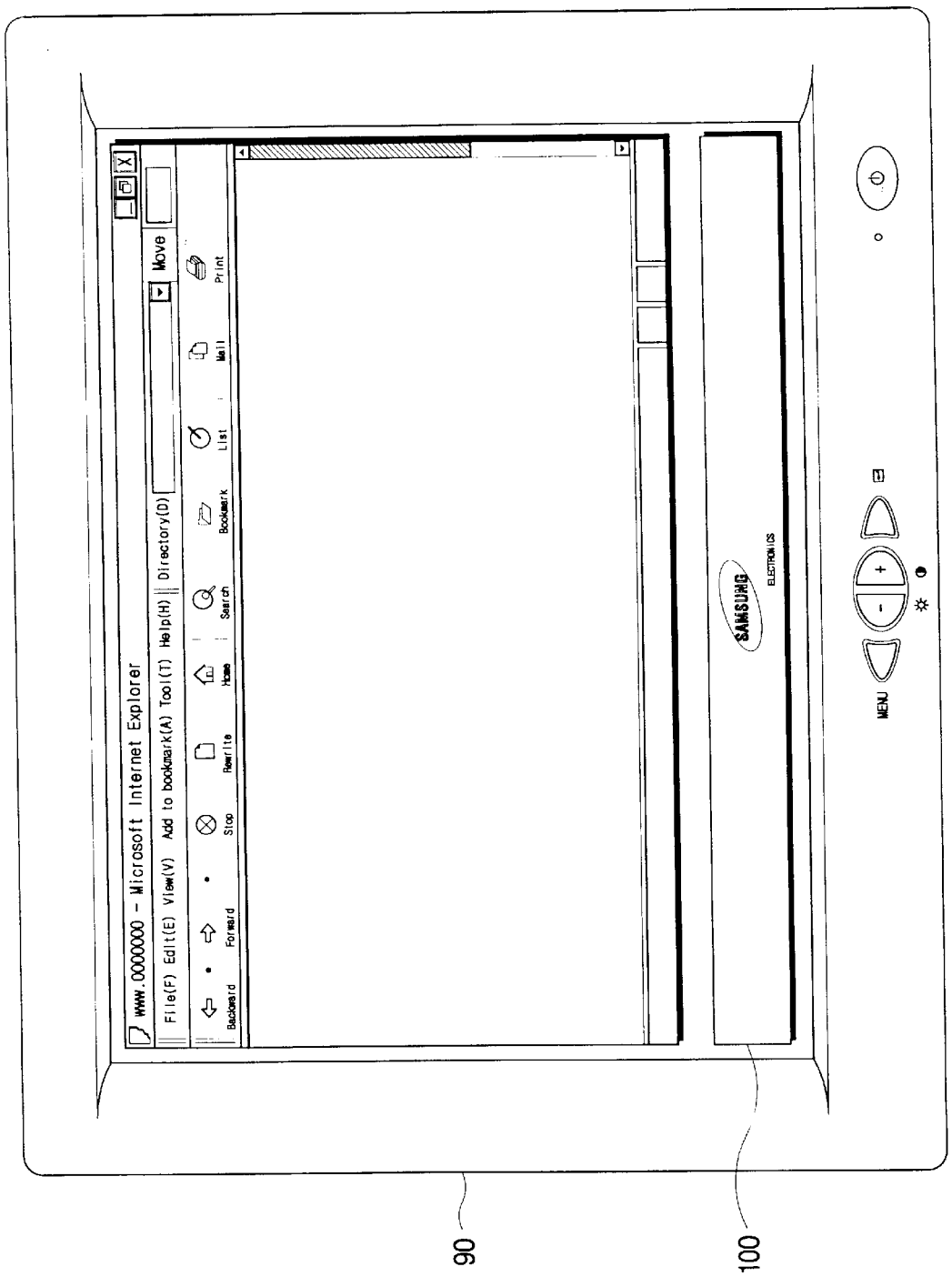
FIG. 3 is a schematic view displaying a screen to which an advertisement is output, for a computer, in accordance with the principles of the present invention.

FIG. 3 is a schematic view displaying a screen to which an advertisement is output, for a computer according to the present invention. As depicted, the advertisement presenting program 75 is capable of outputting the advertisement 100 on the monitor 90 in real-time by accessing an advertisement server at the time as a user's computer is connected to Internet, and making an advertisement downloaded thereinto.

As described above, the SMI generator in the main board generates periodically the SMI interrupt signals while a computer is in use by a user. According to generation of the interrupt signals, the operating SMM program checks the interface periodically to detect whether the advertisement presenting program is operated in the computer. Where the advertisement presenting program is not operated in the computer, the SMM program stops operation of the computer system. Thus, in order to use the computer, the advertisement presenting program must be operating. In consequence, the advertisement is forcibly output to the user, thereby maximizing the advertising effect and reducing the cost of purchasing the computer.

With the computer and the method controlling the same according to the present invention, the advertisements are provided the users off-line while they are using their computers, and thus, the advertising effect is maximized and the user may purchase the computer with a reduced cost.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer apparatus, comprising:

a central processing unit, said central processing unit performing functions including receiving data, processing data, and outputting data;

a memory storing information of said computer;

a display unit displaying varying visual images to a user, said display unit being coupled to said computer;

said memory storing an advertisement presenting program for presenting an advertisement on said display unit, said advertisement presenting program automatically commencing operation after said computer is booted up and suspending operation in response to an action by the user;

a control unit detecting when said advertisement presenting program is operating, said control unit suspending at least one of said functions of said central processing unit when operation of said advertisement present program is suspended;

a system management interrupt generator periodically generating interrupt signals during operation of said central processing unit; and said memory storing a system management mode program, said system management mode program checking when said advertisement presenting program is operating in response to said interrupt signals;

wherein said advertisement presenting program outputs a data value if said advertisement presenting program is operating when said interrupt signals are generated;

wherein said advertisement presenting program outputs said data value to an interface of said memory;

wherein said system management mode program periodically checks said data value when said interrupt signals are generated; and wherein said system management mode program clears said data value.

2. The apparatus of claim 1, said memory including a read only memory basic input output system and a complementary metal oxide semiconductor memory, said interface of said memory being provided in one selected from among said read only memory basic input output system and said complementary metal oxide semiconductor memory.

3. A computer apparatus, comprising:

a central processing unit, said central processing unit performing functions including receiving data, processing data, and outputting data;

a memory storing information of said computer;

a display unit displaying varying visual images to a user, said display unit being coupled to said computer;

said memory storing an advertisement presenting program for presenting an advertisement on said display unit, said advertisement presenting program automatically commencing operation after said computer is booted up and suspending operation in response to an action by the user;

a control unit detecting when said advertisement presenting program is operating, said control unit suspending at least one of said functions of said central processing unit when operation of said advertisement present program is suspended;

a system management interrupt generator periodically generating interrupt signals during operation of said central processing unit;

said memory storing a system management mode program, said system management mode program checking when said advertisement presenting program is operating in response to said interrupt signals; and said memory including a read only memory basic input output system, said system management mode program being stored in said read only memory basic input output system.

4. A computer apparatus, comprising:

a central processing unit, said central processing unit performing functions including receiving data, processing data, and outputting data;

a memory storing information of said computer;

a display unit displaying varying visual images to a user, said display unit being coupled to said computer;

said memory storing an advertisement presenting program for presenting an advertisement on said display unit, said advertisement presenting program automatically commencing operation after said computer is booted up and suspending operation in response to an action by the user;

a control unit detecting when said advertisement presenting program is operating, said control unit suspending at least one of said functions of said central processing unit when operation of said advertisement present program is suspended; and said control unit cutting off power supplied to said central processing unit to perform said suspending of said at least one of said functions of said central processing unit.

5. The apparatus of claim 4, said memory including an auxiliary storage unit storing said advertisement presenting program and storing an application program.

6. An apparatus, comprising:

a first control unit having an input port, said first control unit performing functions including receiving data and outputting data;

an input unit inputting information to said input port of said first control unit;

a memory storing an advertisement presenting program;

a display unit displaying at least one advertisement to a user in accordance with said advertisement presenting program, said advertisement presenting program automatically commencing operation after said apparatus is turned on and suspending operation in response to an action by the user;

a second control unit detecting when said advertisement presenting program is operating, said second control unit suspending at least one of said functions of said first control unit when operation of said advertisement present program is suspended;

a system management interrupt generator periodically generating interrupt signals during operation of said first control unit; and said memory storing a system management mode program, said system management mode program checking when said advertisement presenting program is operating in response to said interrupt signals;

wherein said advertisement presenting program outputs a data value if said advertisement presenting program is operating when said interrupt signals are generated;

wherein said advertisement presenting program outputs said data value to an interface of said memory, said system management mode program periodically checking said data value when said interrupt signals are generated; and wherein said system management mode program clears said data value.

7. The apparatus of claim 6, said memory including a read only memory basic input output system and a complementary metal oxide semiconductor memory, said interface of said memory being provided in one selected from among said read only memory basic input output system and said complementary metal oxide semiconductor memory.

8. The apparatus of claim 7, said second control unit cutting off power supplied to said first control unit to perform said suspending of said at least one of said functions of said first control unit.

9. The apparatus of claim 8, said memory including an auxiliary storage unit storing said advertisement presenting program and storing an application program.

10. A method, comprising:
automatically displaying at least one advertisement on a display monitor to a user when a first control unit is activated and not displaying said at least one advertisement in response to an action by the user, said first control unit performing functions including receiving data and outputting data;

checking periodically to detect if said at least one advertisement is being displayed on said monitor when said first control unit is operating; and stopping at least one of said functions of said first control unit when said at least one advertisement is not being displayed on said monitor;

wherein said stopping of said at least one of said functions of said first control unit includes cutting off power being supplied to said first control unit.

11. The method of claim 10, said checking further comprising:
periodically generating system management interrupt signals;

writing a data value to indicate that said at least one advertisement is being displayed whenever said system management interrupt signals are generated, said writing of said data value corresponding to writing said data value to an interface of a memory; and periodically detecting said data value in accordance with said system management interrupt signals, and clearing said data value.

12. A program storage device, readable by a machine, tangibly embodying a program of instructions executable by the machine to perform a method of maximizing an advertising effort, the method comprising:
automatically displaying at least one advertisement on a display monitor to a user when a first control unit is activated and not displaying said at least one advertisement in response to an action by the user, said first control unit performing functions including receiving data and outputting data;

checking periodically to detect if said at least one advertisement is being displayed on said monitor when said first control unit is operating; and stopping at least one of said functions of said first control unit when said at least one advertisement is not being displayed on said monitor;

wherein the stopping of the at least one of the functions of the first control unit includes cutting off power being supplied to the first control unit.

13. The program storage device of claim 12, the step of checking further comprising:
periodically generating system management interrupt signals;

writing a data value to indicate that said at least one advertisement is being displayed whenever said system management interrupt signals are generated, said writing of said data value corresponding to writing said data value to an interface of a memory; and periodically detecting said data value in accordance with said system management interrupt signals, and clearing said data value.

14. An apparatus, comprising:
a central processing unit, said central processing unit adapted to perform functions including receiving data, processing data, and outputting data;

a memory adapted to store information of said computer;

a display unit adapted to display varying visual images to a user, said display unit being coupled to said computer;

said memory adapted to store an advertisement presenting program to present an advertisement on said display unit, said advertisement presenting program automatically commencing operation after said computer is booted up and suspending operation in response to an action by the user;

a control unit adapted to detect when said advertisement presenting program is in operation, said control unit adapted to suspend at least one of said functions of said central processing unit when operation of said advertisement present program has been suspended;

an input unit; and an input port of said central processing unit, said input unit being connected to said input port of said central processing unit, said control unit adapted to disable said input port of said central processing unit to perform said suspending of said at least one of said functions of said central processing unit.

15. An apparatus, comprising:
a first control unit having an input port, said first control unit adapted to perform functions including receiving data and outputting data;

an input unit adapted to input information to said input port of said first control unit;

a memory adapted to store an advertisement presenting program;

a display unit adapted to display at least one advertisement to a user in accordance with said advertisement presenting program, said advertisement presenting program adapted to automatically commence operation after said apparatus is turned on and to suspend operation in response to an action by the user; and a second control unit adapted to detect when said advertisement presenting program is operating, said second control unit adapted to suspend at least one of said functions of said first control unit when operation of said advertisement present program has been suspended;

said second control unit adapted to disable said input port of said first control unit to perform said suspending of said at least one of said functions of said first control unit.

16. A method, comprising:
automatically displaying at least one advertisement on a display monitor to a user when a first control unit is activated and not ceasing to display said at least one advertisement in response to an action by the user, said first control unit performing functions including receiving data and outputting data;

checking periodically to detect if said at least one advertisement is being displayed on said monitor when said first control unit is operating; and stopping at least one of said functions of said first control unit when said at least one advertisement has ceased to be displayed on said monitor;

said stopping of said at least one of said functions of said first control unit including disabling an input port of said first control unit.

17. A program storage device, readable by a machine, tangibly embodying a program of instructions executable by the machine to perform a method of maximizing an advertising effort, the method comprising:

automatically displaying at least one advertisement on a display monitor to a user when a first control unit is activated and ceasing to display said at least one advertisement in response to an action by the user, said first control unit performing functions including receiving data and outputting data;

checking periodically to detect if said at least one advertisement is being displayed on said monitor when said first control unit is operating; and stopping at least one of said functions of said first control unit when said at least one advertisement has ceased to be displayed on said monitor;

the stopping of the at least one of the functions of the first control unit including disabling an input port of the first control unit.

* * * * *